Patented Dec. 26, 1922.

UNITED STATES PATENT OFFICE.

TENNEY L. DAVIS, OF SOMERVILLE, MASSACHUSETTS.

GUANIDINE NITRATE.

No Drawing.    Application filed April 16, 1921.   Serial No. 461,979.

*To all whom it may concern:*

Be it known that I, TENNEY L. DAVIS, a citizen of the United States, and a resident of Somerville, county of Middlesex, and State of Massachusetts, have invented an Improvement in Guanidine Nitrate. of which the following is a specification.

The subject of this invention is the process for the preparation of guanidine nitrate.

The main object of the invention is to secure a greater yield of guanidine or guanidine salts and, more specifically, the production of two molecules of guanidine from one molecule of dicyandiamide.

At the present time the best known process for the preparation of salts of guanidine consists in hydrolyzing dicyandiamide. During the first step of such a process one molecule of dicyandiamide combines with one molecule of water to form one molecule of guanylurea. In the second step of the process the guanylurea is split by the action of the hydrolytic agent. giving one molecule of ammonia, one of carbon dioxide, and one molecule of guanidine.

In the best known process for the preparation of guanidine salts the dicyandiamide is treated with 60% sulphuric acid at about 160° C. for a period of four to six hours. Sodium carbonate or ammonia water may also be used and the use of ammonia water for this purpose has been made the object of an earlier patent application. This hydrolytic process produces one molecule of guanidine from one molecule of dicyandiamide.

In the process forming the subject of the present invention I bring together dicyandiamide and an ammonium salt, specifically, ammonium nitrate, in such proportions that there are present two molecules of ammonium salt, or slightly more than two molecules, for each molecule of dicyandiamide. The process is conveniently carried out in an autoclave in the presence of a solvent. preferably water, though other solvents, such as alcohol may be used with good results. Water is preferable as a solvent for the reason that it is cheaper. gives slightly better results and produces no odorous by-products.

The substances, having been placed in an autoclave together with the solvent, are heated, the preferred temperature being 160° C., for a sufficient period of time to complete the reaction. The reaction is usually completed in two hours, though heating for a longer period even up to six hours will not have a harmful result.

The mechanism of the reaction is as follows:

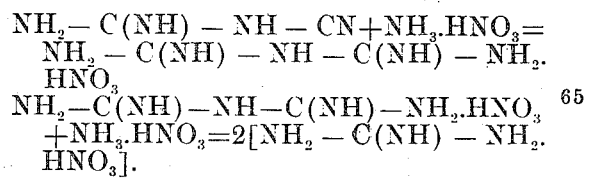

The dicyandiamide first combines with one molecule of nitrate of ammonium to form biguanide nitrate and, upon further heating at a proper temperature, the biguanide nitrate combines with the other molecule of ammonium nitrate to form two molecules of guanidine nitrate. Guanidine nitrate is produced in practically theoretical amount, two molecules of guanidine nitrate for each molecule of dicyandiamide.

Having described my invention what I claim as new and desire to secure by Letters Patent, is:—

1. The process for preparing guanidine nitrate, comprising heating a mixture of dicyandiamide in an autoclave with slightly more than the molecular equivalent of ammonium nitrate and with water of the weight of the ammonium nitrate.

2. The process for preparing guanidine nitrate, comprising heating a mixture of dicyandiamide and ammonium nitrate in the presence of water.

3. The process of preparing guanidine nitrate comprising heating dicyandiamide with ammonium nitrate in the presence of a solvent.

4. The process for preparing guanidine nitrate, comprising heating a mixture of dicyandiamide with at least two molecular equivalents of ammonium nitrate in the presence of water.

TENNEY L. DAVIS.